United States Patent
Ohara et al.

(10) Patent No.: US 9,531,466 B2
(45) Date of Patent: Dec. 27, 2016

(54) DIVERSITY RECEPTION CIRCUIT

(71) Applicant: SOCIONEXT INC., Kanagawa (JP)

(72) Inventors: Atsushi Ohara, Shiga (JP); Yoshifumi Hosokawa, Osaka (JP); Yoshihiro Okumura, Osaka (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 15/012,183

(22) Filed: Feb. 1, 2016

(65) Prior Publication Data

US 2016/0149632 A1 May 26, 2016

Related U.S. Application Data

(63) Continuation of application No. PCT/JP2014/002142, filed on Apr. 15, 2014.

(30) Foreign Application Priority Data

Aug. 6, 2013 (JP) ................................. 2013-163435

(51) Int. Cl.
*H04L 1/02* (2006.01)
*H04B 7/08* (2006.01)

(52) U.S. Cl.
CPC ................................. *H04B 7/0802* (2013.01)

(58) Field of Classification Search
CPC ............ H03L 7/08; H04L 1/0618; H04L 1/06; H04W 52/42; H03J 1/005; H03K 17/6874; H04B 17/0042; H04B 1/1081; H04B 7/0669; H04B 1/0082; H04B 1/28; H04B 1/406; H04B 7/0802; H04B 7/0417; H04B 7/0617
See application file for complete search history.

(56) References Cited

U.S. PATENT DOCUMENTS

| | | | | |
|---|---|---|---|---|
| 6,567,024 B1 * | 5/2003 | Ishikawa | ............ | H03K 17/6874 257/370 |
| 7,702,052 B2 * | 4/2010 | Okada | .................. | H04B 1/0082 375/347 |
| 8,155,610 B2 * | 4/2012 | Elenes | ................. | H04B 1/1081 375/142 |
| 8,244,198 B1 * | 8/2012 | Shlivinski | ................ | H04B 1/28 455/315 |

(Continued)

FOREIGN PATENT DOCUMENTS

| JP | H09-284191 A | 10/1997 |
|---|---|---|
| JP | 2000-341188 A | 12/2000 |

(Continued)

OTHER PUBLICATIONS

International Search Report dated May 13, 2014, issued in corresponding International Application No. PCT/JP2014/002142. (w/ partial English translation).

*Primary Examiner* — Khanh C Tran
(74) *Attorney, Agent, or Firm* — McDermott Will & Emery LLP

(57) ABSTRACT

A diversity reception circuit obtains a synthesized output based on signals received at a plurality of antennas. The diversity reception circuit includes a plurality of PLLs outputting respective local oscillation signals; a plurality of mixers converting respective received radio frequency signals to low frequency signals; and a switch circuit selecting any one of outputs of the PLLs and supplying the selected output to at least one of the mixers.

20 Claims, 14 Drawing Sheets

(56) References Cited

U.S. PATENT DOCUMENTS

| | | | |
|---|---|---|---|
| 2005/0239417 A1* | 10/2005 | Boos | H04B 1/406 455/86 |
| 2006/0166638 A1 | 7/2006 | Iwaida | |
| 2007/0060080 A1 | 3/2007 | Nishimura et al. | |
| 2010/0253438 A1* | 10/2010 | Yamaguchi | H03L 7/08 331/34 |
| 2012/0257701 A1* | 10/2012 | Ahmed | H03J 1/005 375/374 |
| 2013/0122840 A1* | 5/2013 | Jung | H04B 17/0042 455/226.1 |

FOREIGN PATENT DOCUMENTS

| | | |
|---|---|---|
| JP | 2004-235817 A | 8/2004 |
| JP | 2006-197168 A | 7/2006 |
| JP | 2006-203653 A | 8/2006 |
| JP | 2007-074605 A | 3/2007 |
| JP | 2009-044446 A | 2/2009 |

\* cited by examiner

FIG.2

|  | STATE(1)<br>4 DIVERSITY | STATE(2)<br>3+1 | STATE(3)<br>3+1 | STATE(4)<br>3+1 | STATE(5)<br>4 DIVERSITY |
|---|---|---|---|---|---|
| BRANCH 1<br>(SW51) | Ch30:PLL41<br>TS1 NORMAL RECEPTION | Ch30:PLL41<br>TS1 NORMAL RECEPTION | Ch30:PLL41<br>TS1 NORMAL RECEPTION | Ch30:PLL41<br>TS1 NORMAL RECEPTION | Ch32:PLL42<br>TS1 NORMAL RECEPTION |
| BRANCH 2<br>(SW52) | Ch30:PLL41<br>TS1 NORMAL RECEPTION | Ch30:PLL41<br>TS1 NORMAL RECEPTION | Ch30:PLL41<br>TS1 NORMAL RECEPTION | Ch30:PLL41<br>TS1 NORMAL RECEPTION | Ch32:PLL42<br>TS1 NORMAL RECEPTION |
| BRANCH 3<br>(SW53) | Ch30:PLL41<br>TS1 NORMAL RECEPTION | Ch13:PLL42<br>TS2 SEARCHING | Ch14:PLL42<br>TS2 SEARCHING | Ch32:PLL42<br>TS2 END OF SEARCH | Ch32:PLL42<br>TS1 NORMAL RECEPTION |
| BRANCH 4<br>(SW54) | Ch30:PLL41<br>TS1 NORMAL RECEPTION | Ch30:PLL41<br>TS1 NORMAL RECEPTION | Ch30:PLL41<br>TS1 NORMAL RECEPTION | Ch30:PLL41<br>TS1 NORMAL RECEPTION | Ch32:PLL42<br>TS1 NORMAL RECEPTION |

FIG.9

|  | STATE(1)<br>4 DIVERSITY | STATE(2)<br>3+1 | STATE(3)<br>3+1 | STATE(4)<br>3+1 | STATE(5)<br>4 DIVERSITY |
|---|---|---|---|---|---|
| BRANCH 1<br>(SW51) | Ch30:PLL41<br>TS1 NORMAL RECEPTION | Ch30:PLL41<br>TS1 NORMAL RECEPTION | Ch30:PLL41<br>TS1 NORMAL RECEPTION | Ch30:PLL41<br>TS1 NORMAL RECEPTION | Ch32:PLL42<br>TS1 NORMAL RECEPTION |
| BRANCH 2<br>(SW52) | Ch30:PLL41<br>TS1 NORMAL RECEPTION | Ch30:PLL41<br>TS1 NORMAL RECEPTION | Ch30:PLL41<br>TS1 NORMAL RECEPTION | Ch30:PLL41<br>TS1 NORMAL RECEPTION | Ch32:PLL42<br>TS1 NORMAL RECEPTION |
| BRANCH 3<br>(SW53) | Ch30:PLL41<br>TS1 NORMAL RECEPTION | Ch13:PLL42<br>TS2 SEARCHING | Ch30:PLL41<br>TS2 SEARCHING | Ch32:PLL42<br>TS2 END OF SEARCH | Ch32:PLL42<br>TS1 NORMAL RECEPTION |
| BRANCH 4<br>(SW54) | Ch30:PLL41<br>TS1 NORMAL RECEPTION | Ch30:PLL41<br>TS1 NORMAL RECEPTION | Ch30:PLL41<br>TS1 NORMAL RECEPTION | Ch30:PLL41<br>TS1 NORMAL RECEPTION | Ch32:PLL42<br>TS1 NORMAL RECEPTION |

FIG. 10

|  | STATE(1) 4 DIVERSITY | STATE(2) 3+1 | STATE(3) 3+1 | STATE(4) 3+1 | STATE(5) 4 DIVERSITY |
|---|---|---|---|---|---|
| BRANCH 1 (SW51) | Ch30:PLL41 TS1 NORMAL RECEPTION | Ch30:PLL41 TS1 NORMAL RECEPTION | Ch30:PLL41 TS1 NORMAL RECEPTION | Ch30:PLL41 TS1 NORMAL RECEPTION | Ch13:PLL41 TS1 NORMAL RECEPTION |
| BRANCH 2 (SW52) | Ch30:PLL41 TS1 NORMAL RECEPTION | Ch30:PLL41 TS1 NORMAL RECEPTION | Ch30:PLL41 TS1 NORMAL RECEPTION | Ch30:PLL41 TS1 NORMAL RECEPTION | Ch13:PLL41 TS1 NORMAL RECEPTION |
| BRANCH 3 (SW53) | Ch30:PLL41 TS1 NORMAL RECEPTION | Ch13:PLL42 TS2 SEARCHING | Ch14:PLL42 TS2 SEARCHING | Ch32:PLL42 TS2 END OF SEARCH | Ch13:PLL41 TS1 NORMAL RECEPTION |
| BRANCH 4 (SW54) | Ch30:PLL41 TS1 NORMAL RECEPTION | Ch30:PLL41 TS1 NORMAL RECEPTION | Ch30:PLL41 TS1 NORMAL RECEPTION | Ch30:PLL41 TS1 NORMAL RECEPTION | Ch13:PLL41 TS1 NORMAL RECEPTION |

FIG. 15

|  | STATE(1)<br>2 DIVERSITY | STATE(2)<br>1+1 | STATE(3)<br>1+1 | STATE(4)<br>1+1 | STATE(5)<br>2 DIVERSITY |
|---|---|---|---|---|---|
| BRANCH 1<br>(SW51) | Ch30:PLL41<br>TS1 NORMAL RECEPTION | Ch30:PLL41<br>TS1 NORMAL RECEPTION | Ch30:PLL41<br>TS1 NORMAL RECEPTION | Ch30:PLL41<br>TS1 NORMAL RECEPTION | Ch32:PLL42<br>TS1 NORMAL RECEPTION |
| BRANCH 2<br>(SW52) | Ch30:PLL41<br>TS1 NORMAL RECEPTION | Ch13:PLL42<br>TS2 SEARCHING | Ch30:PLL41<br>TS2 SEARCHING | Ch32:PLL42<br>TS2 END OF SEARCH | Ch32:PLL42<br>TS1 NORMAL RECEPTION |

DIVERSITY RECEPTION CIRCUIT

CROSS-REFERENCE TO RELATED APPLICATIONS

This is a continuation of International Application No. PCT/JP2014/002142 filed on Apr. 15, 2014, which claims priority to Japanese Patent Application No. 2013-163435 filed on Aug. 6, 2013. The entire disclosures of these applications are hereby incorporated by reference.

BACKGROUND

The present disclosure relates to a diversity reception circuit.

According to known diversity reception techniques, broadcast waves are received at a plurality of antennas and the received signals are synthesized together, for example, in an onboard TV tuner, to reliably receive the broadcast waves even when the vehicle equipped with the tuner is traveling with reception states varying every moment (see, for example, Japanese Unexamined Patent Publication Nos. H09-284191, 2006-197168, and 2007-074605).

SUMMARY

If four tuners are integrated together in a single-chip monolithic semiconductor circuit, and if phase-locked loops (PLLs) are independently provided as local oscillators for respective branches of a diversity reception circuit, the four PLLs are integrated on the single chip. In this case, each PLL requires a relatively large area on the chip, resulting in an increase in the overall chip area. In addition, interference occurs between each pair of the PLLs, of which the oscillation frequencies are close to each other, to increase spurious emissions and noise generation, thereby raising the risk of degradation in reception sensitivity, for example.

On the other hand, in a configuration in which a PLL is simply shared by a plurality of branches, the frequencies of the branches sharing the PLL are fixed to the same value to provide only a limited degree of flexibility.

The present disclosure provides a small-area diversity reception circuit that achieves improved performance in terms of reception sensitivity, for example, by reducing spurious emissions and noise generation.

In order to achieve this object, the present disclosure provides a diversity reception circuit obtaining a synthesized output based on signals received at a plurality of antennas. The diversity reception circuit includes a plurality of local oscillators outputting respective local oscillation signals; a plurality of frequency converters converting respective received radio frequency signals to low frequency signals; and a switch circuit selecting any one of outputs of the local oscillators and supplying the selected output to at least one of the frequency converters.

As compared to a configuration including local oscillators provided independently for respective branches, the diversity reception circuit according to the present disclosure cuts down the overall circuit area, reduces spurious emissions and noise caused by interference, and therefore has improved performance in terms of reception sensitivity. In addition, a local oscillator may be selected flexibly by turning the switch circuit, thereby providing an increased degree of flexibility.

BRIEF DESCRIPTION OF THE DRAWINGS

FIG. 2 illustrates an exemplary set of state transitions of the diversity reception circuit of FIG. 1.

FIG. 9 illustrates another exemplary set of state transitions of the diversity reception circuit of FIG. 1.

FIG. 10 illustrates yet another exemplary set of state transitions of the diversity reception circuit of FIG. 1.

FIG. 15 illustrates an exemplary set of state transitions of the diversity reception circuit of FIG. 14.

DETAILED DESCRIPTION

Embodiments of the present disclosure will now be described with reference to the drawings.

First Embodiment

Figure 1:
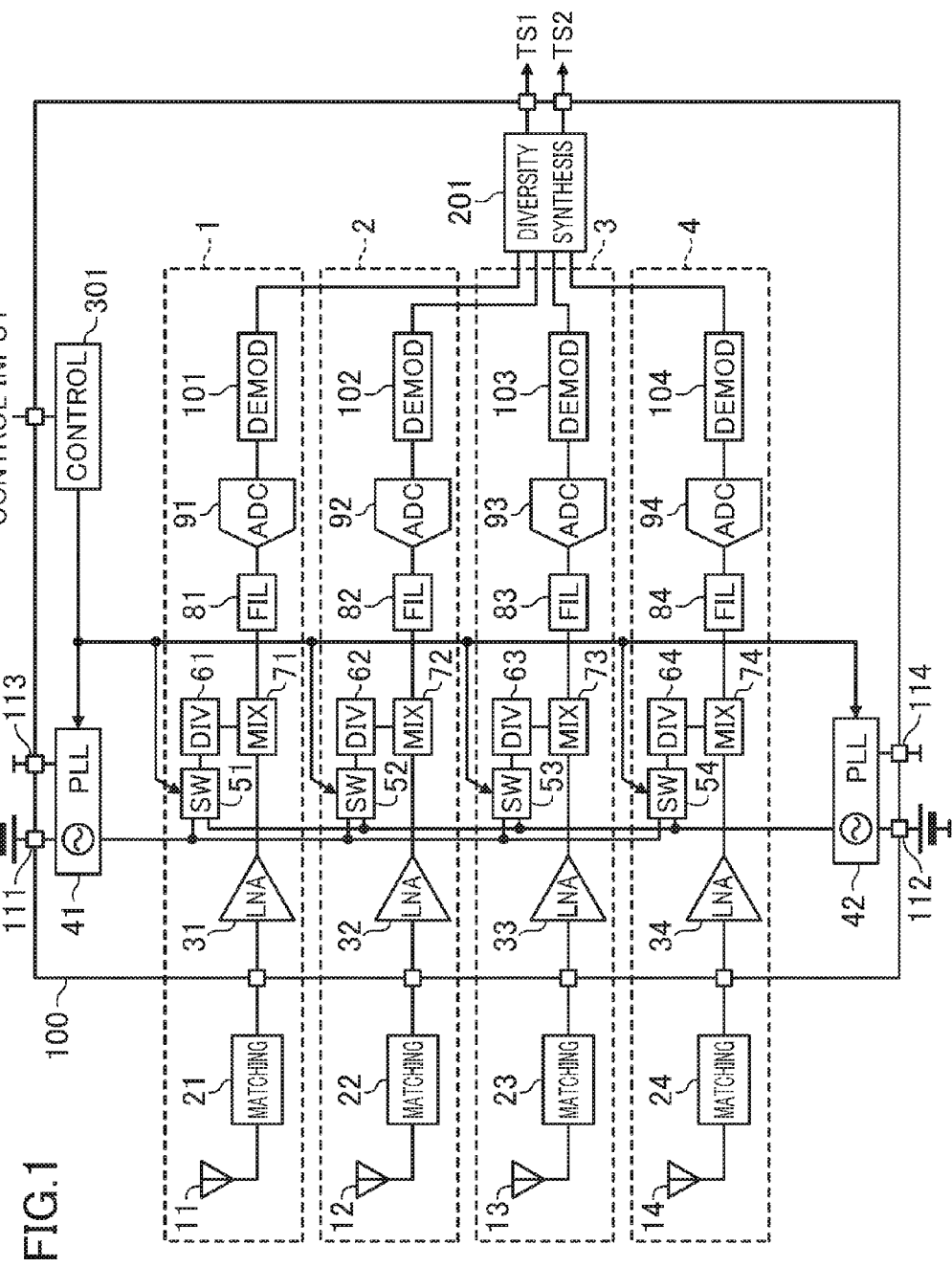
FIG. 1 is a block diagram illustrating a configuration of a diversity reception circuit according to a first embodiment of the present disclosure.

FIG. 1 is a block diagram illustrating a configuration of a diversity reception circuit according to a first embodiment of the present disclosure. The diversity reception circuit of FIG. 1 is configured as a monolithic semiconductor circuit 100 for a TV tuner to obtain synthesized outputs TS1 and TS2 based on signals received at four antennas 11-14. Radio frequency (RF) signals received at the antennas 11-14 are matched by matching circuits 21-24, and then input to the monolithic semiconductor circuit 100. In the monolithic semiconductor circuit 100, the matched RF signals are first amplified by low noise amplifiers (LNAs) 31-34. On the other hand, local oscillation signals generated by first and second PLLs 41 and 42 are selected by switch circuits (SWs) 51-54. The frequencies of the selected local oscillation signals are divided by frequency divider circuits (DIVs) 61-64. The outputs of the LNAs 31-34 are converted to low frequency signals by mixers (MIXs) 71-74 using the outputs of frequency divider circuits 61-64. The bandwidths of the converted outputs are limited by filters (FILs) 81-84. The outputs are then converted to digital signals by analog-to-digital converters (ADCs) 91-94, demodulated by demodulation circuits (DEMODs) 101-104, diversity-synthesized by a diversity synthesis circuit 201, and then output as transport stream signals TS1 and TS2. A control circuit 301 controls the blocks of the monolithic semiconductor circuit 100 in accordance with control inputs. In FIG. 1, however, control of the first and second PLLs 41 and 42 and the switch circuits 51-54, which is particularly relevant to a primary feature of the present disclosure, is shown for the sake of simplicity. The section comprised of the antenna 11, the matching circuit 21, the LNA 31, the switch circuit 51, the frequency divider circuit 61, the mixer 71, the filter 81, the ADC 91, and the demodulation circuit 101 will be hereinafter referred to as a "branch 1." Each of the other branches 2-4 has the same configuration as this branch 1.

A power supply and ground of the first PLL 41 are respectively isolated from a power supply and ground of the second PLL 42. In FIG. 1, the reference numeral 111 denotes a power supply pad of the first PLL 41, 112 denotes a power supply pad of the second PLL 42, 113 denotes a ground pad of the first PLL 41, and 114 denotes a ground pad of the second PLL 42.

As can be seen, according to the first embodiment, the monolithic semiconductor circuit 100 includes the switch circuits 51-54. Thus, the output of an arbitrary one of the first and second PLLs 41 and 42 can be transmitted to the mixers 71-74 via the frequency divider circuits 61-64.

For example, assume that signals with a frequency fRF1 of 473 MHz and a frequency fRF2 of 707 MHz are received at the antennas 11-14. The frequency divider circuits 61-64 have a ¼ frequency dividing function. The first PLL 41 outputs a signal with a frequency fPLL1 of 2828 MHz, the quadruple of 707 MHz. The second PLL 42 outputs a signal with a frequency fPLL2 of 1892 MHz, the quadruple of 473 MHz. Where three switch circuits 51, 52, and 53 select the output of the first PLL 41, and the other switch circuit 54 selects the output of the second PLL 42, the respective outputs of the mixers 71-73 are obtained by the following equation with respect to fRF2 of 707 MHz so that the outputs of the mixers 71-73 have frequencies near DC:

$$|fRF2-fPLL1/4|=|707-2828/4|=0$$

On the other hand, the outputs of the mixers 71-73 are obtained by the following equation with respect to fRF1 of 473 MHz:

$$|fRF1-fPLL1/4|=|473-2828/4|=234 \text{ MHz}$$

If the cutoff frequency of the filters 81-83 is, for example, 3 MHz, the components obtained by converting fRF1 signal attenuates, and only the components obtained by converting fRF2 signal are transmitted to the ADCs 91-93, demodulated by the demodulation circuits 101-103, and then synthesized together by the diversity synthesis circuit 201.

Similarly, the output of the mixer 74 is obtained by the following equation with respect to fRF1 of 473 MHz so that the output of the mixer 74 has a frequency near DC:

$$|fRF1-fPLL2/4|=|473-1892/4|=0$$

On the other hand, the output of the mixer 74 is obtained by the following equation with respect to fRF2 signal of 707 MHz:

$$|fRF2-fPLL2/4|=|707-1892/4|=234 \text{ MHz}$$

If the cutoff frequency of the filter 84 is 3 MHz, the component obtained by converting fRF2 signal attenuates, and only the component obtained by converting fRF1 signal is transmitted to the ADC 94, demodulated by the demodulation circuit 104, and then input to the diversity synthesis circuit 201.

The diversity synthesis circuit 201 outputs, as TS1, the signal obtained by converting fRF2 signal of 707 MHz, demodulated, and synthesized in this manner, and outputs, as TS2, the signal obtained by converting fRF1 signal of 473 MHz, and demodulated.

FIG. 2 illustrates an exemplary set of state transitions of the diversity reception circuit of FIG. 1. For example, when a user is viewing a main window while searching for another affiliated channel, the diversity reception circuit of FIG. 1 allows the user to arbitrarily select one of the first and second PLLs 41 and 42 using the switch circuits 51-54. Thus, for example, if the branch 3 has lower sensitivity than the other branches, the diversity reception circuit may be used such that the first PLL 41 is used to select a channel with respect to the branches 1, 2, and 4 so as to output TS1 to display images on the main window, with the second PLL 42 used with respect to the branch 3 so as to output TS2 to search for the other channel (see State (2)).

After that, when the output TS1 displaying images on the main window via the branches 1, 2, and 4 comes to have decreased sensitivity, while the output TS2 comes to have increased sensitivity after the search via the branch 3 has ended, all the branches may be changed to the TS2-side channel (i.e., transition from State (4) to State (5)). At this time, if the change is made such that all of the switch circuits 51-54 select the second PLL 42, there is no need to reset the frequency at the first PLL 41, and the output of the second PLL 42 may be used as it is. This also provides the advantage of smoothly switching search and channel selection operations from one to the other.

Figure 3:
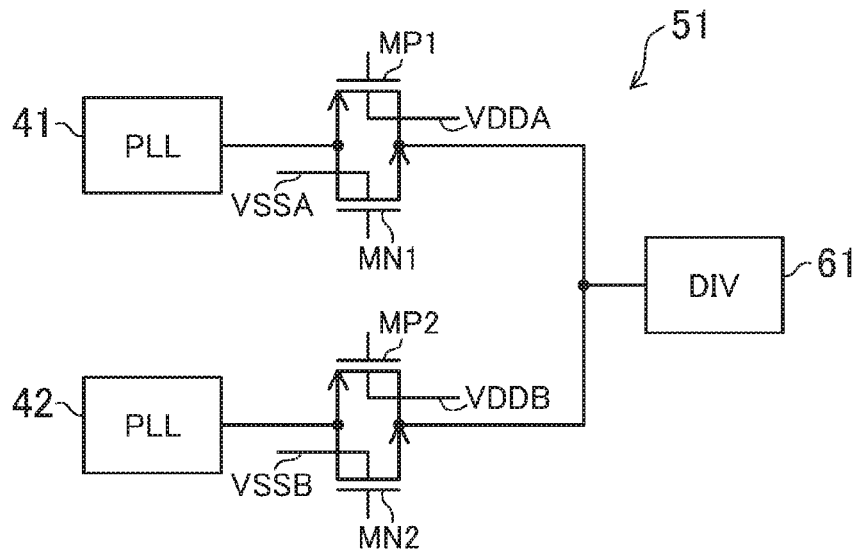
FIG. 3 is a circuit diagram illustrating a specific exemplary configuration of a switch circuit of FIG. 1.

FIG. 3 is a circuit diagram illustrating a specific exemplary configuration of the switch circuit 51 of FIG. 1. The other switch circuits 52-54 may have the same configurations as the one shown in FIG. 3. The switch circuit 51 of FIG. 3 includes a single-stage transfer gate between the output of the first PLL 41 and the input of the frequency divider circuit 61, and another single-stage transfer gate between the output of the second PLL 42 and the input of the frequency divider circuit 61. The former transfer gate is comprised of a PMOS transistor MP1 and an NMOS transistor MN1. The PMOS transistor MP1 has its back gate connected to a power supply VDDA. The NMOS transistor MN1 has its back gate connected to a ground VSSA. The latter transfer gate is comprised of a PMOS transistor MP2 and an NMOS transistor MN2. The PMOS transistor MP2 has its back gate connected to a power supply VDDB. The NMOS transistor MN2 has its back gate connected to a ground VSSB.

According to the configuration shown in FIG. 3, when the switch circuit 51 selects the output of the first PLL 41, that is, when MP1 and MN1 are on, MP2 and MN2 are off. On the other hand, when the switch circuit 51 selects the output of the second PLL 42, that is, MP2 and MN2 are on, MP1 and MN1 are off.

Figure 4:
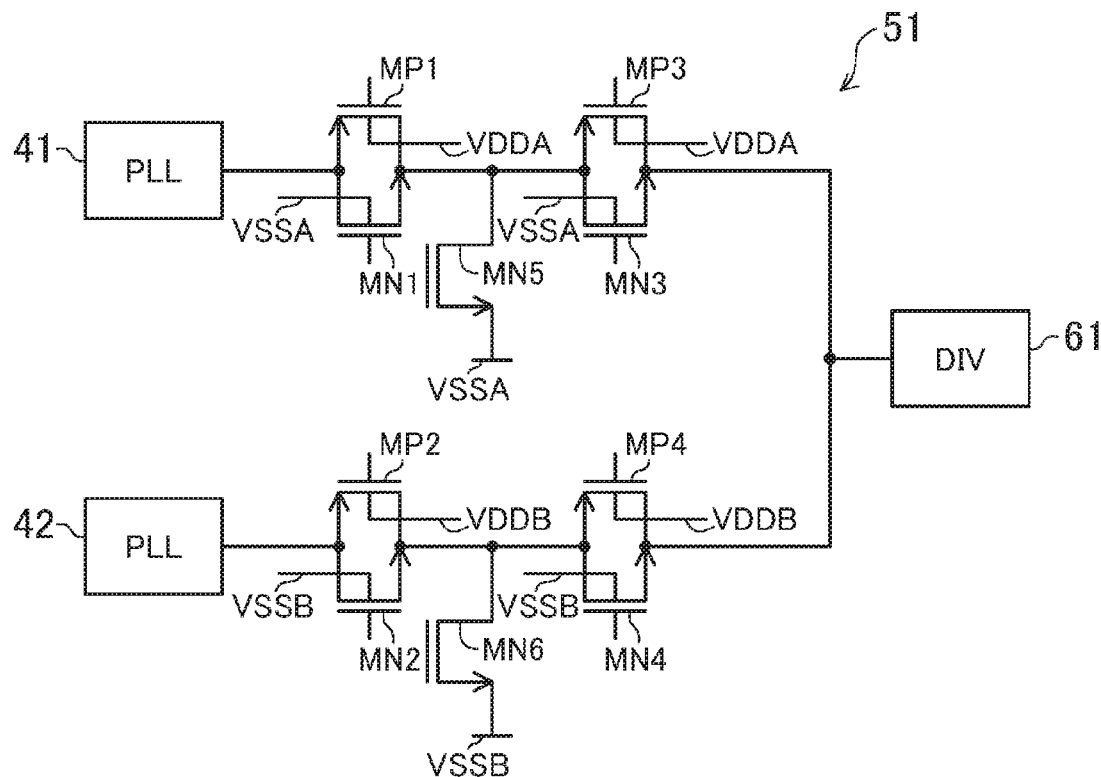
FIG. 4 is a circuit diagram illustrating another specific exemplary configuration of the switch circuit of FIG. 1.

FIG. 4 is a circuit diagram illustrating another specific exemplary configuration of the switch circuit 51 of FIG. 1. The other switch circuits 52-54 have the same configuration as the one shown in FIG. 4. The switch circuit 51 of FIG. 4 includes transfer gates in two stages on a first path between the output of the first PLL 41 and the input of the frequency divider circuit 61, and transfer gates in two stages on a second path between the output of the second PLL 42 and the input of the frequency divider circuit 61. On the first path, the transfer gate in the first stage is comprised of a PMOS transistor MP1 and an NMOS transistor MN1. The PMOS transistor MP1 has its back gate connected to a power supply VDDA. The NMOS transistor MN1 has its back gate connected to a ground VSSA. The transfer gate in the second stage is comprised of a PMOS transistor MP3 and an NMOS transistor MN3. The PMOS transistor MP3 has its back gate connected to the power supply VDDA. The NMOS transistor MN3 has a back gate connected to the ground VSSA. On the second path, the transfer gate in the first stage is comprised of a PMOS transistor MP2 and an NMOS transistor MN2. The PMOS transistor MP2 has its back gate connected to a power supply VDDB. The NMOS transistor MN2 has its back gate connected to a ground VSSB. The transfer gate in the second stage is comprised of a PMOS transistor MP4 and an NMOS transistor MN4. The PMOS transistor MP4 has its back gate connected to the power supply VDDB. The NMOS transistor MN4 has its back gate connected to the ground VSSB. On the first path, a connecting node between the transfer gates in the first and second stages is connected to the ground VSSA via an NMOS transistor MN5. On the second path, the connecting node between the transfer gates in the first and second stages is connected to the ground VSSB via an NMOS transistor MN6.

According to the configuration shown in FIG. 4, for example, when the switch circuit 51 selects the output of the first PLL 41; MP1, MN1, MP3, and MN3 are on, and MN5 is off so that the output of the first PLL 41 is transmitted to the frequency divider circuit 61. On the other hand, although MP2, MN2, MP4, and MN4 are off, the connecting node between the transfer gates in the two stages of the non-selected second PLL 42 can be connected to the ground by turning MN6 on. That is, the switch circuit 51 of FIG. 4 is configured to ensure isolation between a non-selected input and an output. This reduces interference between the outputs of the first and second PLLs 41 and 42. Optionally, transfer gates in three or more stages may also be used.

Figure 5:
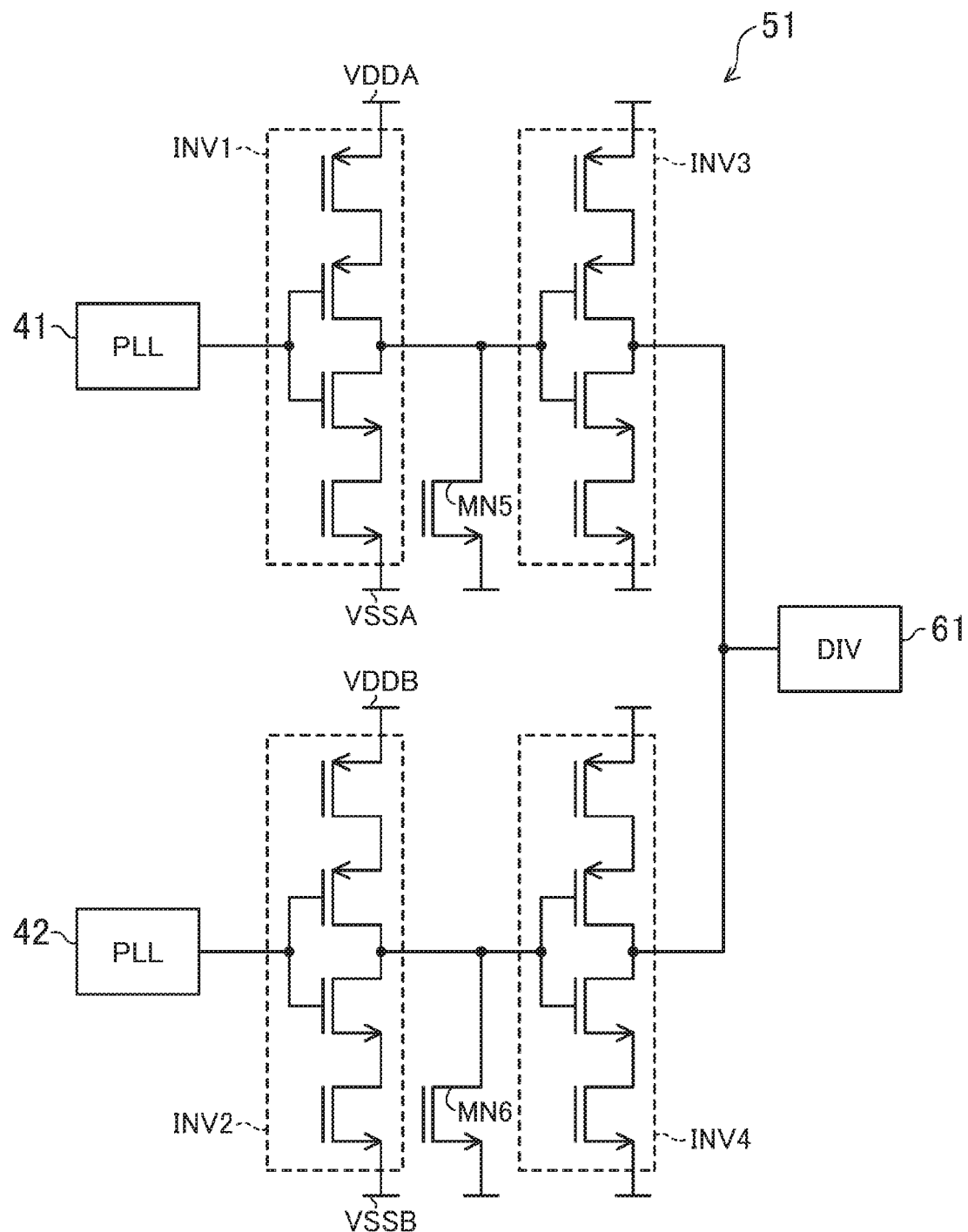
FIG. 5 is a circuit diagram illustrating yet another specific exemplary configuration of the switch circuit of FIG. 1.

FIG. 5 is a circuit diagram illustrating yet another specific exemplary configuration of the switch circuit 51 of FIG. 1. The other switch circuits 52-54 may also have the same configurations as the one shown in FIG. 5. The switch circuit 51 of FIG. 5 includes tri-state inverters INV1 and INV3 in two stages on a first path between the output of the first PLL 41 and the input of the frequency divider circuit 61, and tri-state inverters INV2 and INV4 in two stages on a second path between the output of the second PLL 42 and the input of the frequency divider circuit 61. On the first path, the tri-state inverters INV1 and INV3 in the two stages are connected to a power supply VDDA and a ground VSSA. On the second path, the tri-state inverters INV2 and INV4 in the two stages are connected to a power supply VDDB and a ground VSSB. On the first path, a connecting node between the tri-state inverters INV1 and INV3 at the first and second stages is connected to the ground VSSA via an NMOS transistor MN5. On the second path, a connecting node between the tri-state inverters INV2 and INV4 at the first and second stages is connected to the ground VSSB via an NMOS transistor MN6.

According to the configuration of FIG. 5, for example, when the switch circuit 51 selects the output of the first PLL 41, INV1 and INV3 are on, and MN5 is off so that the output of the first PLL 41 is transmitted to the frequency divider circuit 61 without attenuating. On the other hand, although INV2 and INV4 are off, the connecting node between the tri-state inverters INV2 and INV4 in the two stages of the non-selected second PLL 42 may be connected to the ground by turning MN6 on. That is, the switch circuit 51 of FIG. 5 is configured to ensure isolation between a non-selected input and an output. This reduces interference between the output of the first PLL 41 and the output of the second PLL 42. Optionally, tri-state inverters with three or more stages may also be used.

Figure 6:
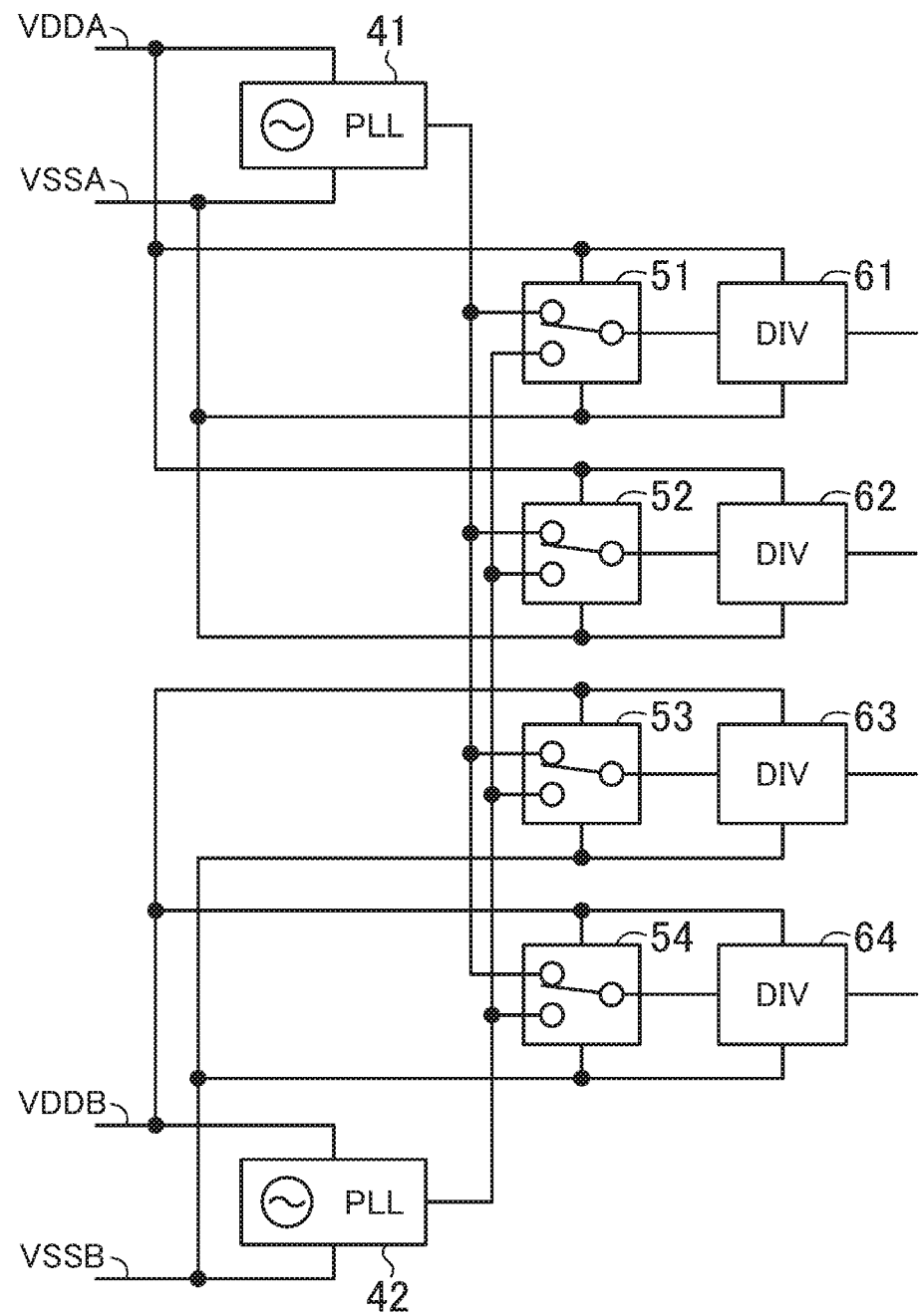
FIG. 6 is a circuit diagram illustrating an exemplary set of power supply and ground lines for the diversity reception circuit of FIG. 1.

FIG. 6 is a circuit diagram illustrating an exemplary set of power supply and ground lines for the diversity reception circuit of FIG. 1. As shown in FIG. 6, in order to prevent or reduce interference between the first and second PLLs 41 and 42, the power supply VDDA and ground VSSA of the first PLL 41 are respectively isolated from the power supply VDDB and ground VSSB of the second PLL 42. The switch circuits 51-52 and the frequency divider circuits 61-62 are fixedly connected to VDDA and VSSA. The switch circuits 53-54 and the frequency divider circuits 63-64 are fixedly connected to VDDB and VSSB.

Figure 7:
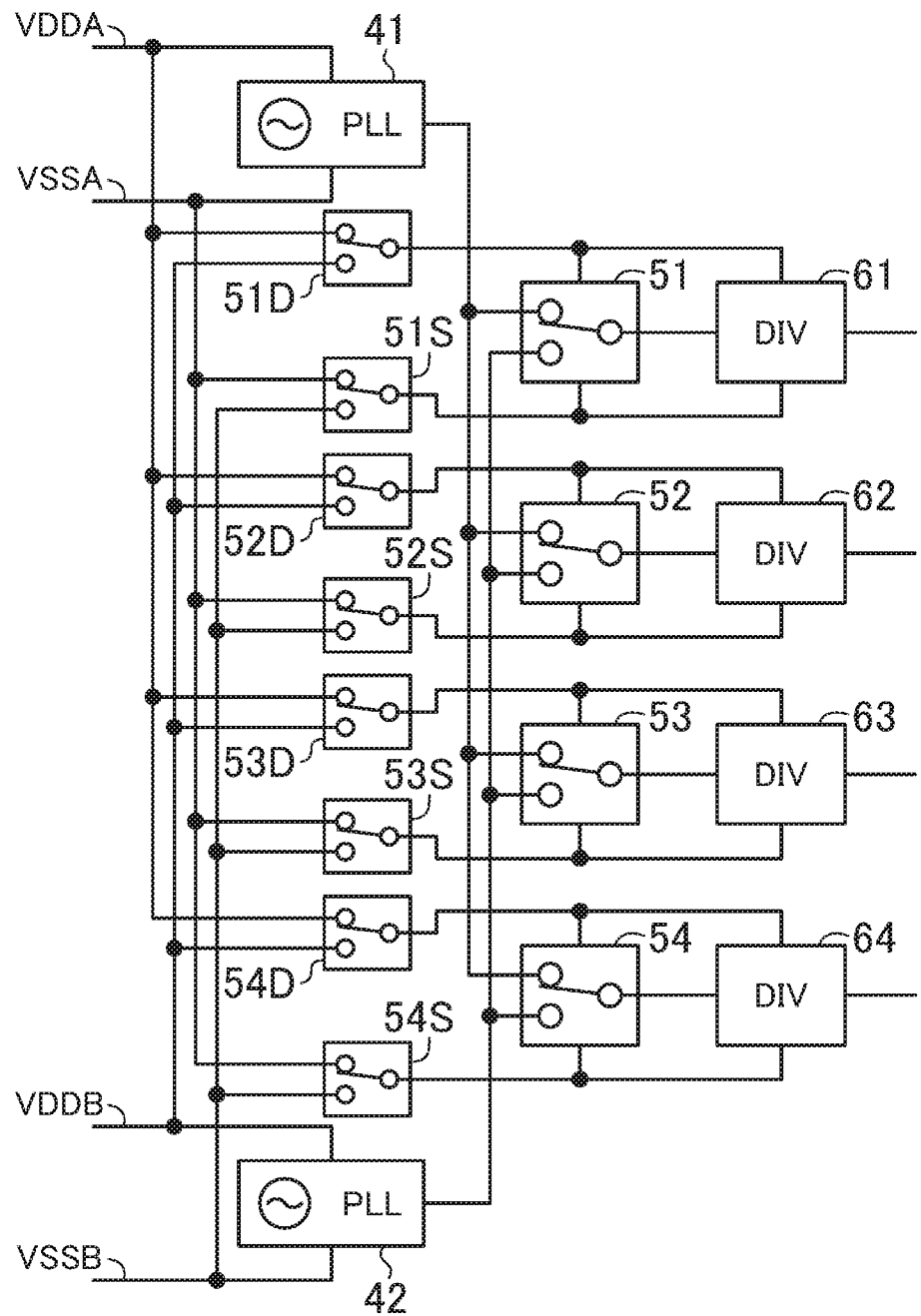
FIG. 7 is a circuit diagram illustrating another exemplary set of power supply and ground lines for the diversity reception circuit of FIG. 1.

FIG. 7 is a circuit diagram illustrating another exemplary set of power supply and ground lines for the diversity reception circuit of FIG. 1. In FIG. 7, the power supply VDDA and ground VSSA of the first PLL 41 are respectively isolated from the power supply VDDB and ground VSSB of the second PLL 42. In addition, VDD switches 51D-54D and VSS switches 51S-54S are provided for the switch circuits 51-54 and the frequency divider circuits 61-64, respectively. The VDD switches 51D-54D and the VSS switches 51S-54S are controlled in conjunction with the switch circuits 51-54 such that each VDD switch 51D-54D or VSS switch 51S-54S supplies a supply voltage or a ground voltage, which is supplied to the PLL selected by an associated one of the switch circuits, to the associated switch circuit and frequency divider circuit. For example, when the switch circuit 51 selects the output of the first PLL 41, the VDD switch 51D connects VDDA of the first PLL 41 to the switch circuit 51 and the frequency divider circuit 61, whereas the VSS switch 51S connects VSSA of the first PLL 41 to the switch circuit 51 and the frequency divider circuit 61. On the other hand, when the switch circuit 51 selects the output of the second PLL 42, the VDD switch 51D connects VDDB of the second PLL 42 to the switch circuit 51 and the frequency divider circuit 61, whereas the VSS switch 51S connects VSSB of the second PLL 42 to the switch circuit 51 and the frequency divider circuit 61. These configurations allow for always connecting appropriate power supply and ground lines to the switch circuits 51-54 and the frequency divider circuits 61-64 in accordance with arbitrary selection of the switch circuits 51-54. This results in effective reduction in the interference between the first and second PLLs 41 and 42.

Figure 8:
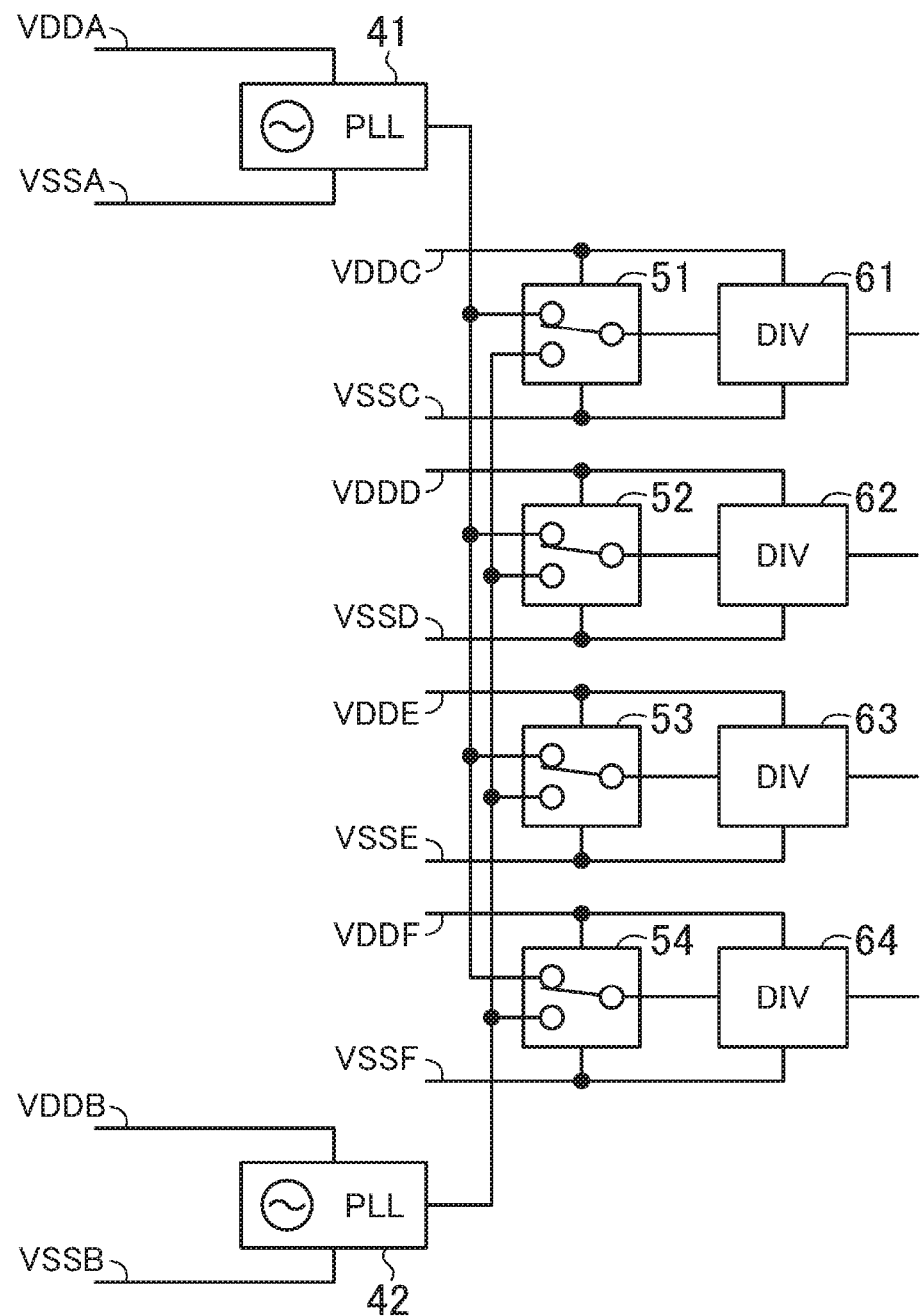
FIG. 8 is a circuit diagram illustrating yet another exemplary set of power supply and ground lines for the diversity reception circuit of FIG. 1.

FIG. 8 is a circuit diagram illustrating yet another exemplary set of power supply and ground lines for the diversity reception circuit of FIG. 1. In FIG. 8, the power supply VDDA and ground VSSA of the first PLL 41 are respectively isolated from the power supply VDDB and ground VSSB of the second PLL 42. In addition, the switch circuit 51 and frequency divider circuit 61 of the branch 1 are connected to a power supply VDDC and a ground VSSC. The switch circuit 52 and frequency divider circuit 62 of the branch 2 are connected to a power supply VDDD and a ground VSSD. The switch circuit 53 and frequency divider circuit 63 of the branch 3 are connected to a power supply VDDE and a ground VSSE. The switch circuit 54 and frequency divider circuit 64 of the branch 4 are connected to a power supply VDDF and a ground VSSF. These power supplies and grounds are independent from VDDA and VSSA of the first PLL 41 as well as VDDB and VSSB of the second PLL 42. In this manner, use of the independent power supply and ground lines for the switch circuits 51-54 and the frequency divider circuits 61-64 also reduces the interference between the first and second PLLs 41 and 42.

In the configuration of FIG. 1, the diversity reception circuit with four branches is configured to select the output of an arbitrary one of PLLs, thereby requiring no dedicated PLL for each branch. This allows for selecting an arbitrary channel using the two PLLs 41 and 42. In general, PLLs used for diversity reception circuits include LC tank voltage-controlled oscillators (VCOs) which generate low phase noise, and thus require a large area on the chip. Cutting down the number of PLLs to be smaller than the number of branches contributes to reducing the overall area and eventually the costs of the monolithic semiconductor circuit 100. An increase in the number of PLLs would raise a risk of interference between the PLLs. However, since the number of PLLs is reduced to two according to the present disclosure, care needs to be taken of only the interference between the two PLLs 41 and 42.

At this time, the power supply pad 111 and ground pad 113 of the first PLL 41 are respectively isolated from the power supply pad 112 and ground pad 114 of the second PLL 42 as shown in FIG. 1, the interference between the first and second PLLs 41 and 42 is reducible. In addition, if the pads 111 and 113 and the pads 112 and 114 are arranged in the vicinity of mutually different sides of the monolithic semiconductor circuit 100 as shown in FIG. 1, influence of coupling between wiring inductors or influence of the semiconductor substrate is reducible, too.

FIG. 9 illustrates another exemplary set of state transitions of the diversity reception circuit of FIG. 1. For example, when one of the PLL systems happens to select the same channel as the other PLL system while performing a search operation or when the same channel is selected on both of two windows, as shown in State (3) of FIG. 9, the control circuit 301 may be configured to use the PLL associated with the channel that has been viewed for all of the switch circuits 51-54 including the branches currently used for searching, and stop operating the non-use PLL. This reduces the influence of the interference when signals with the same frequency are received simultaneously. Alternatively, the non-used PLL and the currently used PLL may have mutually different operating frequencies, since interference would occur easily if their frequencies are close to each other. Optionally, two or more branches may also be used to perform search.

FIG. 10 illustrates yet another exemplary set of state transitions of the diversity reception circuit of FIG. 1. In State (5) of FIG. 2, the channel selected by the second PLL 42 at the end of search is used as it is. Instead, as shown in FIG. 10, the most appropriate channel may be selected using the first PLL 41 after the end of search. At this time, PLLs with different characteristics may be used. For example, the first PLL 41 may have high performance and the second PLL 42 may have low power dissipation. In that case, the first PLL 41 with high performance may be selected for either branch used to display images on the main window of two windows or a branch used for normal reception, while the second PLL 42 with low power dissipation may be selected for either a branch used to display images on a sub-window of the two windows or a branch used for search and reception. This configuration allows for achieving high performance and low power consumption for the overall diversity reception circuit.

Figure 11:
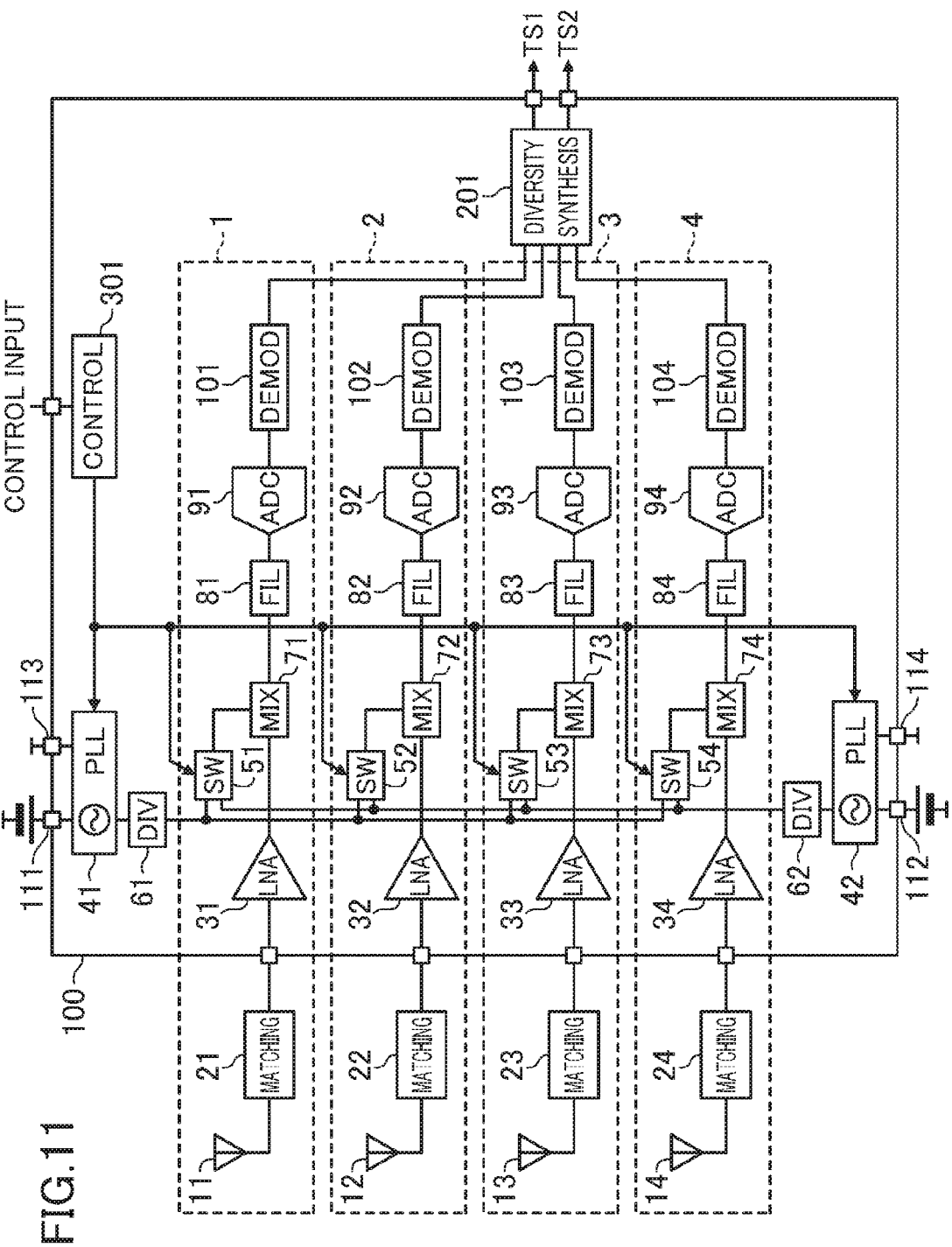
FIG. 11 is a block diagram illustrating a variation of the diversity reception circuit of FIG. 1.

FIG. 11 is a block diagram illustrating a variation of the diversity reception circuit of FIG. 1. In FIG. 11, a first frequency divider circuit 61 is interposed between a first PLL 41 and switch circuits 51-54, and a second frequency divider circuit 62 is interposed between a second PLL 42 and the switch circuits 51-54.

Figure 12:
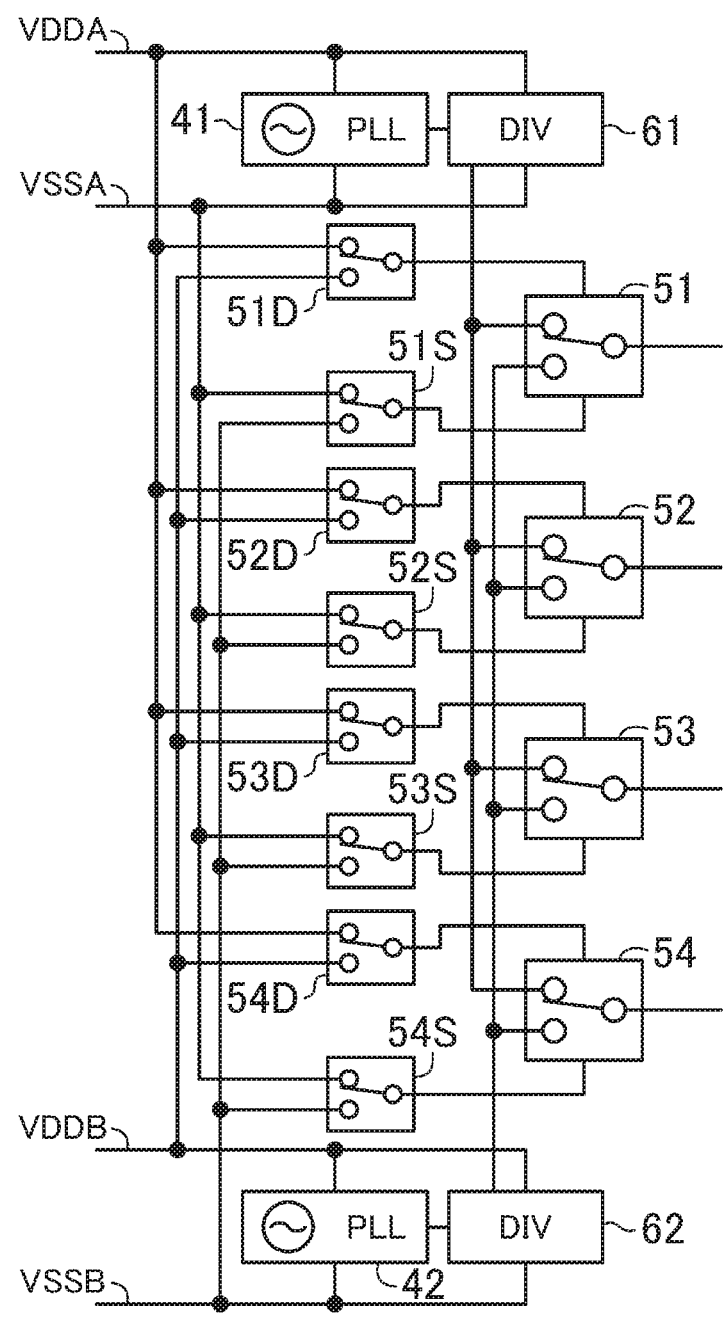
FIG. 12 is a circuit diagram illustrating an exemplary set of power supply and ground lines for the diversity reception circuit of FIG. 11.

FIG. 12 is a circuit diagram illustrating an exemplary set of power supply and ground lines for the diversity reception circuit of FIG. 11. In FIG. 12, the power supply VDDA and ground VSSA of the first PLL 41 and the first frequency divider circuit 61 are respectively isolated from the power supply VDDB and the ground VSSB of the second PLL 42 and the second frequency divider circuit 62. VDD switches 51D-54D and VSS switches 51S-54S are provided for the respective switch circuits 51-54. The VDD switches 51D-54D and the VSS switches 51S-54S are controlled in conjunction with the switch circuits 51-54 such that each VDD switch 51D-54D or VSS switch 51S-54S supplies a supply voltage or a ground voltage, which is supplied to the PLL and the frequency divider circuit selected by an associated one of the switch circuits, to the associated switch circuit. For example, when the switch circuit 51 selects the output of the first PLL 41, the VDD switch 51D connects VDDA of the first PLL 41 and first frequency divider circuit 61 to the switch circuit 51, whereas the VSS switch 51S connects VSSA of the first PLL 41 and first frequency divider circuit 61 to the switch circuit 51. On the other hand, when the switch circuit 51 selects the output of the second PLL 42, the VDD switch 51D connects VDDB of the second PLL 42 and second frequency divider circuit 62 to the switch circuit 51. The VSS switch 51S connects VSSB of the second PLL 42 and second frequency divider circuit 62 to the switch circuit 51. These configurations allows for always connecting appropriate power supply and ground lines to the switch circuits 51-54 in accordance with arbitrary selection of the switch circuits 51-54. This results in effective reduction in the interference between the first and second PLLs 41 and 42.

Figure 13:
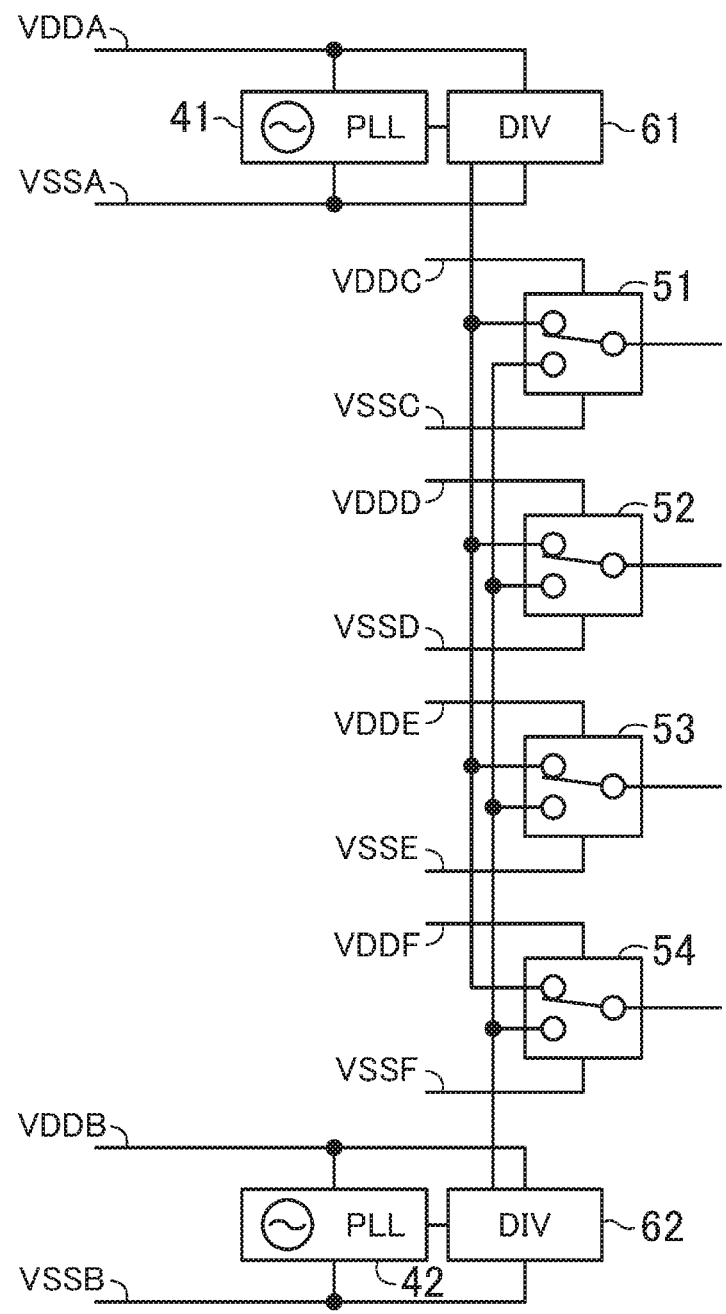
FIG. 13 is a circuit diagram illustrating another exemplary set of power supply and ground lines for the diversity reception circuit of FIG. 11.

FIG. 13 is a circuit diagram illustrating another exemplary set of power supply and ground lines for the diversity reception circuit of FIG. 11. In FIG. 13, the power supply VDDA and ground VSSA of the first PLL 41 and the first frequency divider circuit 61 are respectively isolated from the power supply VDDB and ground VSSB of the second PLL 42 and the second frequency divider circuit 62. The switch circuit 51 of the branch 1, the switch circuit 52 of the branch 2, the switch circuit 53 of the branch 3, and the switch circuit 54 of the branch 4 are connected to a power supply VDDC and a ground VSSC, a power supply VDDD and a ground VSSD, a power supply VDDE and a ground VSSE, and a power supply VDDF and a ground VSSF, respectively. VDDA and VSSA of the first PLL 41 and the first frequency divider circuit 61 are respectively independent from VDDB and VSSB of the second PLL 42 and the second frequency divider circuit 62. In this manner, use of these independent power supply and ground lines for the switch circuits 51-54 also reduces the interference between the first and second PLLs 41 and 42.

Second Embodiment

Figure 14:
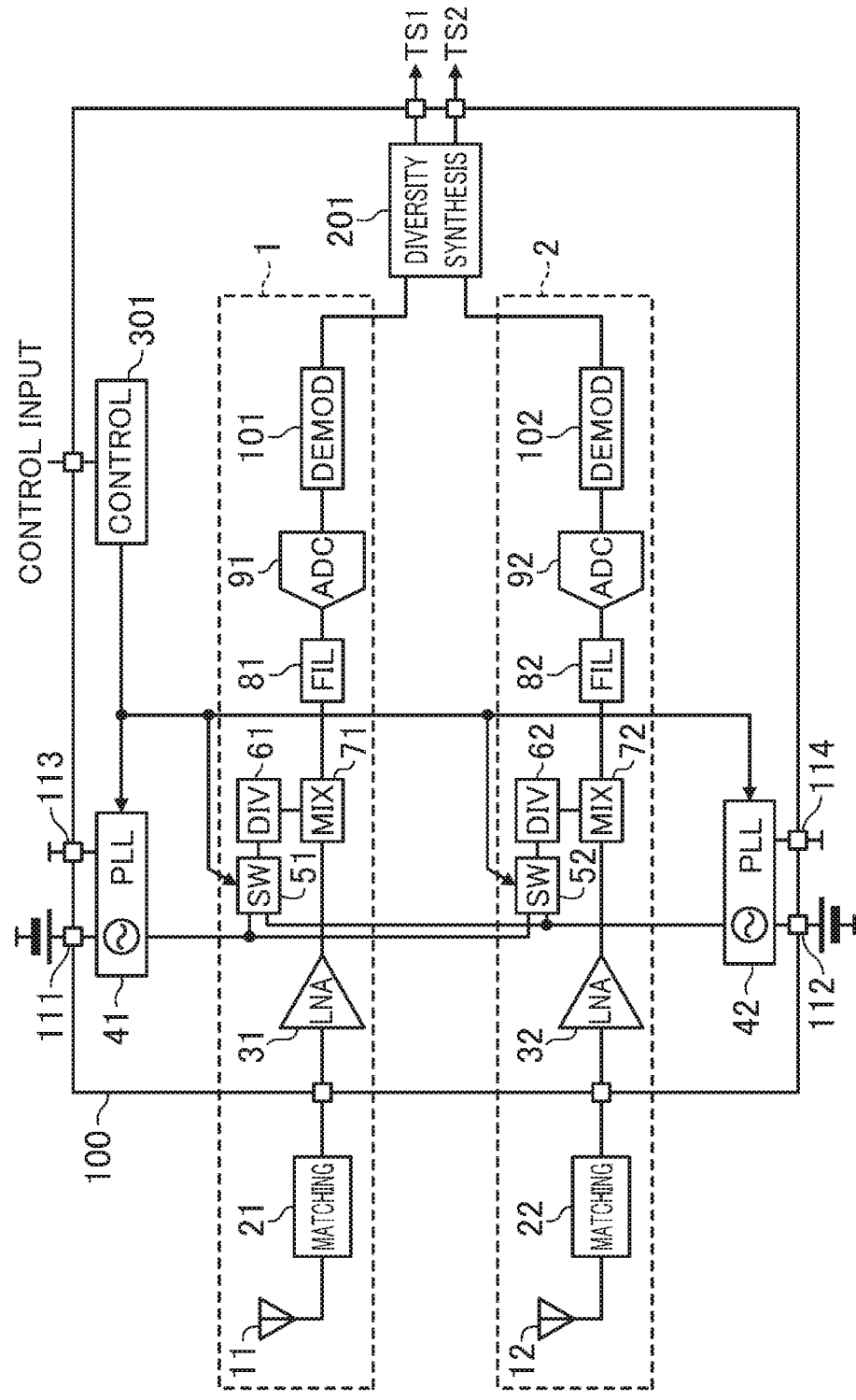
FIG. 14 is a block diagram illustrating a configuration of a diversity reception circuit according to a second embodiment of the present disclosure.

FIG. 14 is a block diagram illustrating a configuration of a diversity reception circuit according to a second embodiment of the present disclosure. In this embodiment, two PLLs 41 and 42 are provided for the diversity reception circuit with two branches. A switch circuit 51 is provided at a preceding stage of a frequency divider circuit 61 and a mixer 71 of a branch 1. The switch circuit 51 selects one of the outputs of the first and second PLLs 41 and 42. A switch circuit 52 is provided at a preceding stage of a frequency divider circuit 62 and a mixer 72 of a branch 2. The switch circuit 52 arbitrarily selects one of the outputs of the first and second PLLs 41 and 42.

FIG. 15 illustrates an exemplary set of state transitions of the diversity reception circuit of FIG. 14. Each of the switch circuits 51 and 52 may select an arbitrary one of the outputs of the first and second PLLs 41 and 42. This prevents or reduces the interference by operating only one PLL when signals are received normally to display images on a single window as shown in States (1) and (5), for example, or when the same channel happens to be selected while performing a search or using two windows simultaneously as shown in State (3). As in the transition from State (4) to State (5), the PLL may be used as it is for normal reception after the search, thereby enabling smooth reception.

As can be seen from the foregoing, the first and second embodiments have been described as mere examples of the technique disclosed in the present application. However, the present application is not limited thereto. As other embodiments, modifications, replacements, additions, and omissions may be made as appropriate. Further embodiments may include combinations of the elements described above.

For example, while the switch circuits 51-54 are arranged at preceding stages of all the mixers 71-74 in the examples described above, the switch circuits 51-54 may be arranged at a preceding stage of at least one of the mixers 71-74. In this case as well, the mixers with the switch circuits are switchable and thus provide advantages. In FIGS. 6-8, for example, while both the power supply and ground lines are isolated, one of the power supply and ground lines may be isolated.

The diversity reception circuit according to the present disclosure may be used effectively to reduce spurious emissions and noise generation caused by interference when signals with multiple different frequencies are received, and improving performance of the diversity reception circuit in terms of reception sensitivity, reduces the area to be occupied on the chip by the circuit and eventually the overall areas of the chips.

What is claimed is:

1. A diversity reception circuit obtaining a synthesized output based on signals received at a plurality of antennas, the diversity reception circuit comprising:
    a plurality of local oscillators outputting respective local oscillation signals;
    a plurality of frequency converters converting respective received radio frequency signals to low frequency signals; and
    a switch circuit selecting any one of outputs of the local oscillators and supplying the selected output to at least one of the frequency converters,
    wherein the number of the local oscillators is smaller than the number of the frequency converters, and
    at least one of power supplies and/or grounds of the local oscillators are isolated from each other.

2. The diversity reception circuit of claim 1, wherein
    the isolated power supplies and/or grounds of the local oscillators are connected to pads isolated from each other, and
    the isolated pads are arranged in a vicinity of mutually different sides of a monolithic semiconductor.

3. The diversity reception circuit of claim 1, further comprising:
    a switch controlled to supply, to the switch circuit, a supply voltage or a ground voltage supplied to one of the local oscillators selected by the switch circuit.

4. The diversity reception circuit of claim 1, wherein
    at least one of a power supply and ground of the switch circuit is independent from the power supplies and grounds of the local oscillators.

5. The diversity reception circuit of claim 1, wherein the diversity reception circuit is mounted on a monolithic semiconductor.

6. The diversity reception circuit of claim 1, wherein the switch circuit includes transfer gates in two or more stages.

7. The diversity reception circuit of claim 6, wherein the switch circuit further includes a switch connecting a connecting node between the transfer gates in the two or more stages to ground when the transfer gates are not selected.

8. The diversity reception circuit of claim 1, wherein the switch circuit includes tri-state inverters in two or more stages.

9. The diversity reception circuit of claim 8, wherein the switch circuit further includes a switch connecting a connecting node between the tri-state inverters in the two or more stages to ground when the tri-state inverters are not selected.

10. A diversity reception circuit obtaining a synthesized output based on signals received at a plurality of antennas, the diversity reception circuit comprising:
    a plurality of local oscillators outputting respective local oscillation signals;
    a plurality of frequency converters converting respective received radio frequency signals to low frequency signals;
    a switch circuit selecting any one of outputs of the local oscillators and supplying the selected output to at least one of the frequency converters; and
    a plurality of frequency divider circuits, each being interposed between an associated one of the local oscillators and the switch circuit,
    wherein the number of the local oscillators is smaller than the number of the frequency converters.

11. The diversity reception circuit of claim 10, wherein
    at least one of power supplies and/or grounds of the local oscillators and frequency divider circuits are isolated from each other.

12. The diversity reception circuit of claim 11, wherein
    the isolated power supplies and/or grounds of the local oscillators and frequency divider circuits are connected to pads isolated from each other, and
    the isolated pads are arranged in a vicinity of mutually different sides of a monolithic semiconductor.

13. The diversity reception circuit of claim 11, further comprising:
    a switch controlled to supply, to the switch circuit, a supply voltage or a ground voltage supplied to one of the local oscillators and one of the frequency divider circuits selected by the switch circuit.

14. The diversity reception circuit of claim 11, wherein
    at least one of a power supply and ground of the switch circuit is independent from the power supplies and grounds of the local oscillators and frequency divider circuits.

15. The diversity reception circuit of claim 10, wherein the diversity reception circuit is mounted on a monolithic semiconductor.

16. The diversity reception circuit of claim 10, wherein the switch circuit includes transfer gates in two or more stages.

17. The diversity reception circuit of claim 16, wherein the switch circuit further includes a switch connecting a connecting node between the transfer gates in the two or more stages to ground when the transfer gates are not selected.

18. The diversity reception circuit of claim 10, wherein the switch circuit includes tri-state inverters in two or more stages.

19. The diversity reception circuit of claim 18, wherein the switch circuit further includes a switch connecting a connecting node between the tri-state inverters in the two or more stages to ground when the tri-state inverters are not selected.

20. A diversity reception circuit obtaining a synthesized output based on signals received at a plurality of antennas, the diversity reception circuit comprising:
  a plurality of local oscillators outputting respective local oscillation signals;
  a plurality of frequency converters converting respective received radio frequency signals to low frequency signals;
  a switch circuit selecting any one of outputs of the local oscillators and supplying the selected output to at least one of the frequency converters; and
  a control circuit controlling the switch circuit to select only one of the local oscillators and to stop operating a non-selected one of the local oscillators when the frequency converters are operating using outputs of the local oscillators having an identical frequency,
  wherein the number of the local oscillators is smaller than the number of the frequency converters.

\* \* \* \* \*